United States Patent
Zhang et al.

(10) Patent No.: US 10,137,539 B2
(45) Date of Patent: Nov. 27, 2018

(54) WELDING CLAMPING DEVICE

(71) Applicant: CRRC QINGDAO SIFANG CO., LTD., Qingdao, Shandong (CN)

(72) Inventors: Shixin Zhang, Shandong (CN); Xiaojun Deng, Shandong (CN); Shaoqing Liu, Shandong (CN); Lichun Meng, Shandong (CN); Xiaocheng Wang, Shandong (CN); Shitao Li, Shandong (CN); Zhanling Zhang, Shandong (CN); Li Dong, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/504,614

(22) PCT Filed: Sep. 21, 2015

(86) PCT No.: PCT/CN2015/090125
§ 371 (c)(1),
(2) Date: Feb. 16, 2017

(87) PCT Pub. No.: WO2016/045561
PCT Pub. Date: Mar. 31, 2016

(65) Prior Publication Data
US 2017/0239761 A1   Aug. 24, 2017

(30) Foreign Application Priority Data

Sep. 23, 2014  (CN) .......................... 2014 1 0491669

(51) Int. Cl.
*B21J 13/08* (2006.01)
*F16H 25/08* (2006.01)
(Continued)

(52) U.S. Cl.
CPC ........ *B23K 37/0435* (2013.01); *B23K 26/348* (2015.10); *B23K 26/702* (2015.10); *B23K 37/0408* (2013.01); *B23K 37/0443* (2013.01)

(58) Field of Classification Search
CPC ...................... B23K 26/1429; B23K 37/0435; B23K 37/04; B23K 37/0452; B23K 37/0461;
(Continued)

(56) References Cited

FOREIGN PATENT DOCUMENTS

| CN | 203031178 U | 7/2013 |
|---|---|---|
| CN | 103769783 A | 5/2014 |

(Continued)

OTHER PUBLICATIONS

Chinese to English Machine translations of CN 103769783, CN 204221247, WO 9942243, KE 20040020324, and CN 203031178.*
(Continued)

*Primary Examiner* — Michael G Hoang
(74) *Attorney, Agent, or Firm* — U.S. Fairsky LLP; Yue (Robert) Xu

(57) ABSTRACT

A welding clamping device includes a base plate and two positioning slide blocks, each of the positioning slide blocks includes a slide base and a cam, wherein the slide base includes a support plate and two cam holders fixed at two opposite ends of the support plate; the cam is rotatably mounted between the two cam holders via a camshaft for press-fitting a workpiece to be welded; and the base plate is provided with a slide slot, and the two positioning slide blocks are relatively slidably mounted in the slide slot. The device can better position a workpiece to be welded, improving welding quality; and clamping and unloading are easy and take a short time, improving welding efficiency.

9 Claims, 1 Drawing Sheet

(51) Int. Cl.
*F16H 53/00* (2006.01)
*B23K 37/04* (2006.01)
*B23K 26/348* (2014.01)
*B23K 26/70* (2014.01)

(58) Field of Classification Search
CPC ............... B23K 37/047; B23K 37/053; B23K 37/0531; B23K 37/0533; B23K 37/0535; B23K 37/0536; B23K 37/0538; B23K 37/08; B23K 37/0408; B23K 37/0443; B23K 26/702; B21J 13/08; F16H 25/08; F16H 53/00
USPC .... 219/158–161; 292/27, 32, 34, 37, 46, 49, 292/165, 182, 185, 232, 245
See application file for complete search history.

(56) References Cited

FOREIGN PATENT DOCUMENTS

| | | |
|---|---|---|
| CN | 104227303 A | 12/2014 |
| CN | 204221247 U | 3/2015 |
| KR | 20040020324 | 3/2004 |
| WO | 9942243 A1 | 8/1999 |

OTHER PUBLICATIONS

International Search Report for PCT/CN2015/090125, dated Dec. 30, 2015, ISA/CN.

\* cited by examiner

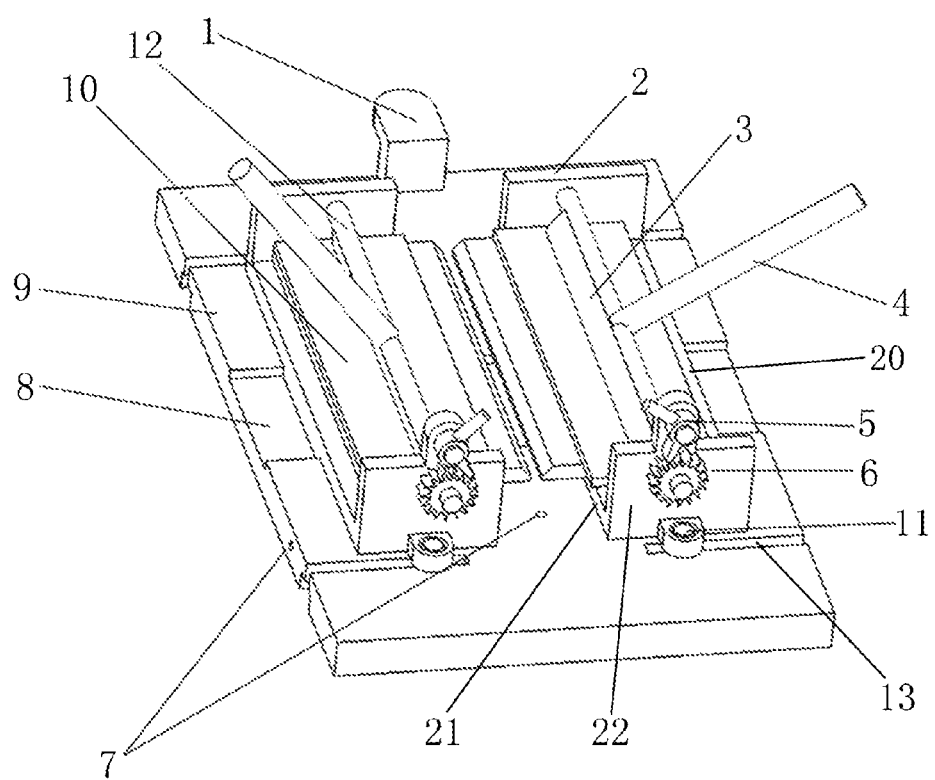

WELDING CLAMPING DEVICE

This application is the national phase of International Application No. PCT/CN2015/090125, titled "WELDING CLAMPING DEVICE", filed on Sep. 21, 2015, which claims the benefit of priority to Chinese Patent Application No. 201410491669.5 titled "WELDING CLAMPING DEVICE", filed with the Chinese State Intellectual Property Office on Sep. 23, 2014, the entire disclosures of both applications are incorporated herein by reference.

FIELD

The present application relates to the technical field of welding auxiliary devices, and particularly to a welding clamping device.

BACKGROUND

With the development of industrial production, higher and higher requirements are imposed on production efficiency. Laser-MIG hybrid welding (laser-metal inert gas hybrid welding) is widely used. In the welding process, conventional welding fixtures are generally mould-layer type welding fixtures, which can only clamp a single work piece to be welded, seriously affecting the processing efficiency. Moreover, it requires screwing and unscrewing bolts repeatedly when the welding fixtures are loaded and unloaded, which is time-consuming, thereby adversely affecting the welding efficiency. Also, the fixation of the work piece is not firm enough, which is apt to cause the work piece to fracture during processing, thereby increasing costs and reducing efficiency. The Laser-MIG hybrid welding has a large heat input, and the work piece to be welded may be oxidized since the back thereof is exposed to the air.

SUMMARY

(1) Technical Issues to be Addressed

An object of the present application is to provide a welding clamping device which is capable of clamping two work pieces to be welded and can be loaded and unloaded easily.

(2) Technical Solutions

To address the above technical issues, a welding clamping device according to the present application is provided, which includes a base plate and two positioning sliding blocks; wherein each of the positioning sliding blocks includes a sliding seat and a cam, the sliding seat includes a support plate, and two cam holders arranged opposite to each other and fixed at two ends of the support plate; the cam is rotatably installed between the two cam holders via a camshaft and is configured to press fit a work piece to be welded; the base plate is provided with a slide slot, and the two positioning sliding blocks are slidably installed in the slide slot.

The welding clamping device further includes an electrode contact fixed on the base plate.

Each of the positioning sliding blocks further includes a ratchet and a pawl, the ratchet is fixed at an end of the camshaft, and the pawl is rotatably installed on the respective cam holder and configured to lock the ratchet.

The welding clamping device further includes multiple interference adjusting plates, wherein thicknesses of the multiple interference adjusting plates are not all the same, and the interference adjusting plates are configured to be installed between the cam and the work piece to be welded.

The interference adjusting plates are made of a copper material or an aluminum material.

A clamping handle is connected to the camshaft, and is configured to rotate the camshaft.

The base plate is provided with a protective airway connected to an external inert gas supplying device.

A positioning socket is provided at each of two ends of the support plate, positioning slots are provided at two sides of the slide slot respectively, and the positioning slots are respectively connected to the positioning sockets via positioning bolts, to fix the positioning sliding block.

The slide slot has a cross section in a trapezoid-like shape.

The welding clamping device further includes two sets of linear unites respectively installed at two sides of the positioning sliding blocks, wherein each set of the linear unites includes a servo motor and a ball screw, the ball screw has two threaded rods having opposite screwing directions, a nut is provided on each of the threaded rods; the two positioning sliding blocks are respectively connected to the two nuts of the ball screw; and the ball screw is connected to the servo motor.

(3) Advantageous Effects

The welding clamping device according to the present application has a simple structure and a light weight, and is convenient to move. The welding clamping device is capable of clamping two work pieces to be welded, better positioning the work pieces to be welded and improving the quality of welding. The welding clamping device can load and unload the work pieces easily, without screwing and unscrewing the bolts repeatedly, thereby reducing the working time and improving the welding efficiency. The protective airway is provided in the base plate, thus the welding clamping device can perform an inert gas shield in the welding process, and is particularly suitable for a laser-MIG hybrid welding.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings of the present application in the following description are only some examples of the present application, and for the person skilled in the art, other drawings may be obtained based on these drawings without any creative efforts.

FIG. 1 is a perspective view of the structure of a first embodiment of the present application.

REFERENCE NUMERALS IN THE DRAWING 1 electrode contact,
2 positioning sliding block,
3 cam,
4 clamping handle,
5 pawl,
6 ratchet,
7 protective airway,
8 slide slot,
9 base plate,
10 interference adjusting plate, 11 positioning socket,
12 camshaft,
13 positioning slide slot,
20 sliding seat,
21 support plate, and
22 cam holder.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Referring to FIG. 1, a welding clamping device according to the present application includes an electrode contact 1, a base plate 9 and two positioning sliding blocks 2. The electrode contact 1 is fixed on the base plate 9. Each of the positioning sliding blocks 2 includes a sliding seat 20 and a cam 3, and the sliding seat 20 includes a support plate 21 and two cam holders 22 fixed at two opposite ends of the support plate 21. The cam holders 22 are preferably embodied as vertical plates. The cam 3 is rotatably installed between the two cam holders 22 via a camshaft 12, and is configured to press fit a work piece to be welded. A clamping handle 4 for rotating the camshaft 12 is connected to the camshaft 12. By rotating the clamping handle 4, the cam 3 is driven to clamp the work piece to be welded. The base plate 9 is provided with a slide slot 8, and the two positioning sliding blocks 2 are slidably installed in the slide slot 8, and can move along the slide slot 8. A projection is provided on a bottom surface of the support plate 21 and has a shape matching with the shape of the slide slot 8. Preferably, the slide slot 8 has a cross section in a trapezoidal-like shape, which can have a position-limiting effect, to allow the sliding seats 20 to slide more stably. Each of the positioning sliding blocks 2 further includes a ratchet 6 and a pawl 5, the ratchet 6 is fixed at an end of the respective camshaft 12, and the pawl 5 is rotatably installed on the respective cam holder 22 and is configured to lock the ratchet 6.

Further, the clamping device further includes multiple interference adjusting plates 10, and the thicknesses of the multiple interference adjusting plates 10 are not all the same. The interference adjusting plates 10 are configured to be installed between the cam 3 and the work piece to be welded. In order to prevent the cam from damaging the work piece, the interference adjusting plates 10 are installed between the cam 3 and a surface of the work piece to be welded. The interference adjusting plates 10 of different thicknesses are required when work pieces of different thickness are to be welded, and the interference adjusting plate 10 is selected as required. Preferably, the interference adjusting plates 10 are made of a copper material or an aluminum material. The copper material or the aluminum material has a low hardness, which facilitates better clamping the work piece to be welded and also prevents the work piece to be welded from being scraped. The base plate 9 is provided with a protective airway 7 connected to an external inert gas supplying device (not shown). The protective airway 7 includes an air inlet and an air outlet in communication with each other. The air inlet is arranged on a side edge of the base plate 9, and the air outlet is arranged below a position corresponding to a welding seam in welding.

Further, positioning sockets 11 are provided at two ends of each of the support plates 21 respectively, positioning slots 13 are provided at two sides of the slide slot 8 respectively, and the positioning slots 13 are respectively connected to the positioning sockets 11 via positioning bolts, to fix the positioning sliding blocks. The base plate 9 is provided with four positioning slots 13, each of which has a cross section of a ""-like shape, and the positioning slots 13 are located at two sides of the slide slot 8 and in parallel with the slide slot 8. The positioning sockets 11 are provided at two ends of each of the support plates 21, and each of the positioning sockets 11 has internal threads. The positioning bolt is screwed into the respective positioning socket 11, a lower end of the positioning bolt passes through the positioning slot 11, and a fastener is installed at the lower end of the positioning bolt. When it is required to fix the positioning sliding block 2, each of the positioning bolts is screwed to allow the fastener located at the lower portion of the positioning bolt to be stuck in the respective positioning slot 13, thus the positioning sliding block 2 cannot move freely, thereby fixing the position of the positioning sliding block 2.

In using the welding clamping device according to the present application, two work pieces to be welded are disposed on the support plates 21 of the sliding seats 20 respectively, the interference adjusting plates 10 are selected as needed, and then are installed on the work pieces to be welded respectively. The clamping handles 4 are rotated to allow the cams 3 to clamp the work pieces to be welded, and then the positioning sliding blocks 2 are moved to allow the two positioning sliding blocks 2 to come close to each other, and when the positioning sliding blocks 2 are moved to a welding point, the positioning bolts are screwed to fix the two positioning sliding blocks 2, and then the welding process is performed. After the welding process is completed, the clamping handles 4 are reversely rotated to release the cams, and the interference adjusting plates 10 and the welded work pieces are taken out in the listed sequence, thereby completing the welding process. In the case that multiple work pieces having the same size are to be welded, in the subsequent welding operation, each of the work pieces to be welded can be inserted from a side of the support plate 21, and it is no longer required to adjust the positions of the positioning sliding blocks 2. The welding clamping device according to the present application has a simple structure and a light weight, and is convenient to move. The welding clamping device is capable of clamping two work pieces to be welded, better positioning the work pieces to be welded and improving the quality of welding. The welding clamping device can load and unload the work pieces easily, without screwing and unscrewing the bolts repeatedly, thereby reducing the working time and improving the welding efficiency. The protective airway is provided in the base plate, thus the welding clamping device can perform an inert gas shield in the welding process, and is particularly suitable for a laser-MIG hybrid welding.

Second Embodiment:

This embodiment is identical to the first embodiment except that the clamping device in this embodiment further includes two sets of linear unites (not shown) respectively installed at two sides of the positioning sliding blocks 2, each set of the linear unites includes a servo motor and a ball screw. The ball screw has two threaded rods having opposite screwing directions, a nut is provided on each of the threaded rods. The two positioning sliding blocks are respectively connected to two nuts of the ball screw. The ball screw is connected to the servo motor. The ball screw is installed on the base plate 9 and is in parallel with the slide slot 8, and the servo motor drives the ball screw to rotate, thereby bringing the two positioning sliding blocks 2 opposite to each other to come close to each other or move away from each other.

The above described embodiments are only the preferred embodiments of the present application, and are not intended to limit the present application. Any modifications, substitutions, improvements and the like, made within the spirit and principle of the present application, are deemed to fall into the scope of the present application.

What is claimed is:

1. A welding clamping device, comprising a base plate and two positioning sliding blocks; wherein each of the positioning sliding blocks comprises a sliding seat and a cam, each sliding seat comprises a support plate, and two cam holders arranged opposite to each other and fixed at two ends of the support plate of the each sliding seat; each cam is rotatably installed, via its own respective camshaft, between the two cam holders of its respective positioning sliding block, and each cam is configured to press fit a respective work piece to be welded; the base plate is provided with a slide slot, and the two positioning sliding blocks are slidably installed in the slide slot.

2. The welding clamping device according to claim 1, further comprising an electrode contact fixed on the base plate.

3. The welding clamping device according to claim 1, wherein each of the positioning sliding blocks further comprises a ratchet and a pawl, each ratchet is fixed at an end of the camshaft rotatably installed to the cam of its respective positioning sliding block, and each pawl is rotatably installed on one of the two cam holders of its respective positioning sliding block, and is configured to lock the ratchet of its respective positioning sliding block.

4. The welding clamping device according to claim 1, further comprising a plurality of interference adjusting plates, wherein thicknesses of the plurality of interference adjusting plates are not all the same, and the interference adjusting plates are configured to be installed between each of the cams and the respective work piece to be welded.

5. The welding clamping device according to claim 4, wherein the interference adjusting plates are made of a copper material or an aluminum material.

6. The welding clamping device according to claim 1, wherein a clamping handle is connected to each of the respective camshafts, and is configured to rotate the each of the respective camshafts.

7. The welding clamping device according to claim 1, wherein the base plate is provided with a protective airway connected to an external inert gas supplying device.

8. The welding clamping device according to claim 1, wherein a positioning socket is provided at each of two ends of each support plate, positioning slots are provided at two sides of the slide slot respectively, and the positioning slots are respectively connected to the positioning sockets via positioning bolts, to fix the two positioning sliding blocks.

9. The welding clamping device according to claim 1, wherein the slide slot has a cross section in a trapezoid-like shape.

* * * * *